Patented Oct. 17, 1933

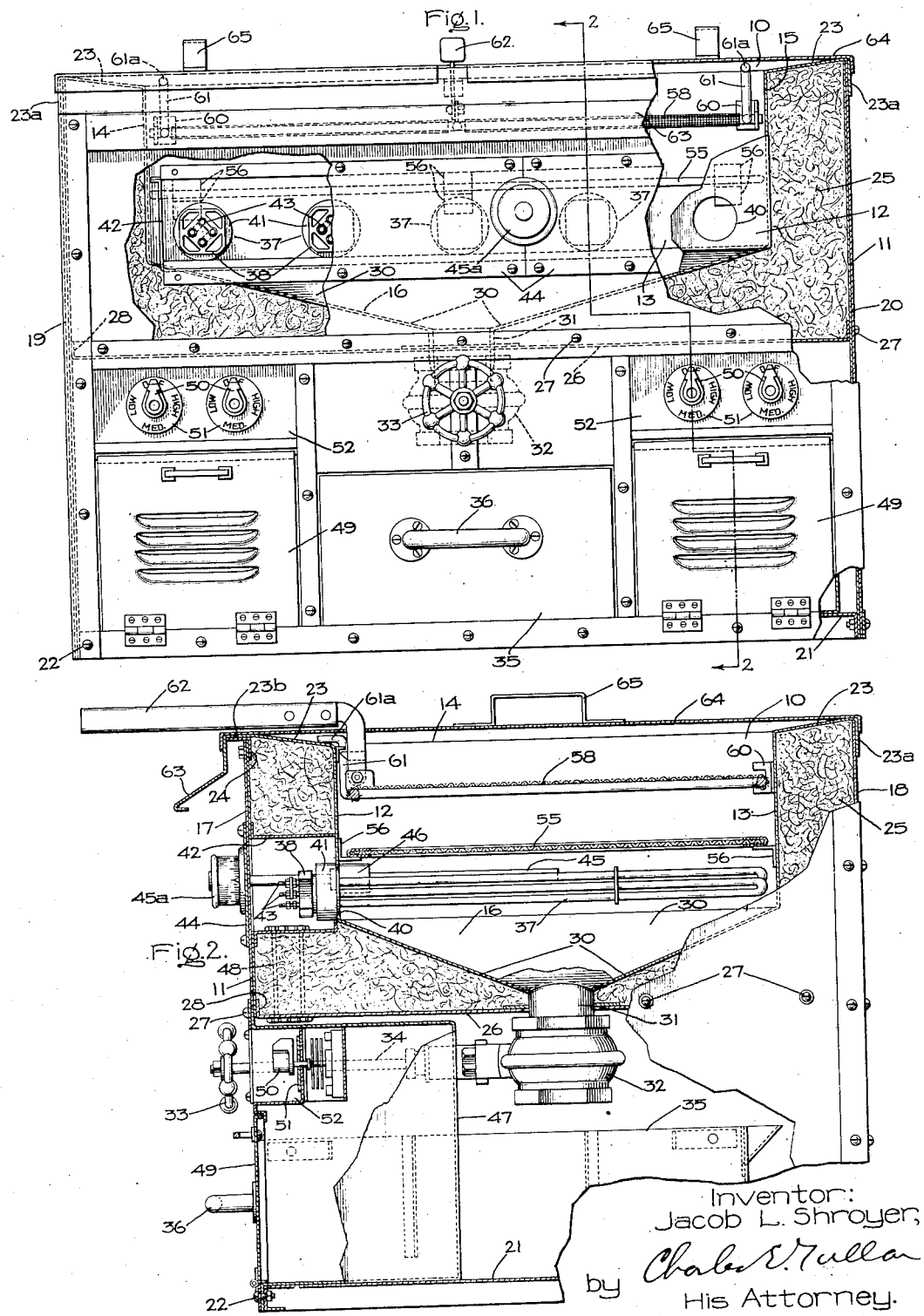

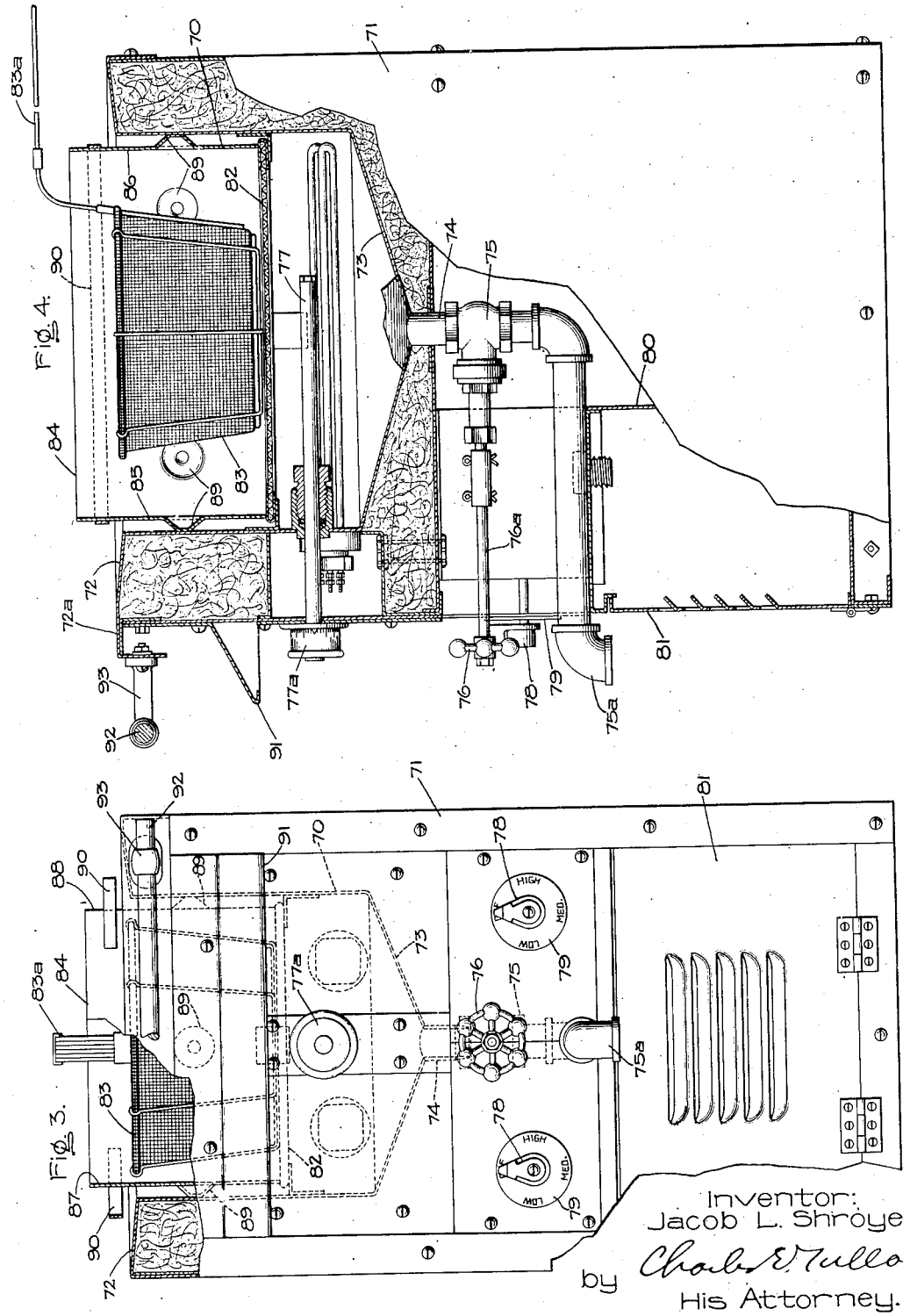

1,931,120

UNITED STATES PATENT OFFICE 1,931,120

FRYING APPARATUS

Jacob L. Shroyer, Oak Park, Ill., assignor to Edison Electric Appliance Company, Chicago, Ill., a corporation of New York Application January 28, 1930. Serial No. 424,048

9 Claims. (Cl. 53—7)

My invention relates to frying apparatus, more particularly to fry kettles for use in the preparation of edibles such as doughnuts, crullers, potatoes, meats, sea foods, etc., and has for its object the provision of an improved kettle of this character.

Frying operations of the above mentioned character require a very close control of the grease temperature in order to prevent a grease soggy or a grease hardened product. One aspect of my invention is the provision of a fry kettle which inherently will provide a close and accurate temperature control of the grease frying medium.

In addition to this requirement with respect to the temperature control, it is necessary that the kettle be absolutely free from fire hazards, and desirable that it be fairly simple to operate, economical in its operation and moreover, that it be of a comparatively simple and inexpensive construction.

In carrying my invention into effect in one form thereof, I provide the grease kettle with immersion heating units positioned so as to produce the required frying temperature in the fry portions of the kettle while permitting the temperature of the grease in the sediment portions of the kettle to remain comparatively cool. Preferably, the units will be positioned slightly below but relatively close to the frying level of the grease. This is an important feature of my invention in that it avoids any possibility of the sediment burning or of the grease carbonizing. The grease is thereby kept pure and fresh and thus may be used over and over again. Suitable valved drain means are provided so that the grease together with the sediment may be removed as desired.

I provide suitable means for controlling the heating units responsively to the temperature of the grease so that these units will operate to maintain a substantially constant preselected grease temperature. Preferably, the temperature controlling means will be caused to respond to the temperature of the grease at the heating level.

I preclude any possibility of fire by the provision of the electric immersion units and the provision of guard means for preventing overflow of grease foam from the kettle. This guard means in addition to its safety feature possesses a further advantage in that it effects a comparatively large saving in that portion of the grease which in the past was allowed to run over the edge of the kettle and waste.

To facilitate the operation of the kettle I arrange the heating unit controls and the valve control at the front of the kettle so as to be readily accessible to the attendant.

For a more complete understanding of my invention reference should be had to the accompanying drawings in which Fig. 1 is a front elevation of a fry kettle embodying my invention, portions being broken away to illustrate certain structural details, Fig. 2 is an end elevation of the fry kettle of Fig. 1 with parts in section taken through the line 2—2 of Fig. 1; Fig. 3 is a front elevation of a fry kettle embodying a modified form of my invention, parts being broken away illustrate certain structural details; and Fig. 4 is an end elevation of the fry kettle of Fig. 3 with the portions in section.

Referring more particularly to Figs. 1 and 2, I have shown my invention in one form in connection with a fry kettle adapted particularly for the frying of doughnuts, crullers and like edibles. As shown, this fry kettle comprises a grease container or kettle 10 supported and enclosed in an outer shell or casing 11. The grease kettle 10 is of box-like construction having front and rear walls 12 and 13, a pair of end walls 14 and 15 and a bottom wall 16.

The shell 11 is also of box-like formation. Thus, the shell has front and rear walls 17 and 18, a pair of end walls 19 and 20 and a bottom wall 21. Preferably, these walls will be formed from a suitable sheet metal such as steel. It will be understood that these walls forming the outer shell 11 will be secured to each other in any suitable manner such as by screw fastening means 22 so as to form a sturdy supporting structure for the kettle.

As shown, the kettle 10 is provided at the upper edges of its end, front and rear walls with an outwardly projecting and upwardly sloping peripheral flange 23, the outer edge of which is turned or flanged downwardly on three sides 23a so as to lie flush with the end and rear walls of the casing 11. The front portion 23b of the flange is projected outwardly beyond the front wall 17 of the casing in a substantially horizontal direction so as to form a table or ledge. This flange portion is secured to the front wall through the medium of an angle member 24 to which the flange portion 23b is secured in any suitable manner as by welding and which as shown is bolted to the front plate 17. The flange portions 23a are secured to their respective end and rear walls in any suitable manner, such as by welding.

Preferably and as shown, the front, rear and end walls of the kettle 10 together with the flange portion 23 will be formed from a single piece of suitable sheet metal, such as steel.

A layer 25 of suitable insulating material, such as rock wool, surrounds the walls of the kettle. As shown, this layer is interposed between the front, end and rear walls of the kettle and the corresponding walls of the shell 11, and between the bottom wall 16 of the kettle and a false bottom 26. This bottom is formed from a suitable sheet metal, such as steel, and is secured to the walls of the casing in any suitable manner as by screw fastening means 27, a peripheral upright flange 28 being provided on the bottom for receiving the screws.

The bottom wall 16 of the kettle 10 is provided with a plurality (four) of inclined portions 30 which slope downward from the front, rear and end walls toward the center of the bottom where a valved drain is provided. As shown, this drain comprises a pipe or drain portion 31 which is connected with the central portion of the bottom wall, and a valve 32 connected to the drain 31. Preferably, this valve will be of the quick-opening type and will be controlled by a suitable hand wheel 33 arranged at the front of the casing and mechanically connected with the valve by means of an extension stem 34. A suitable receiving container 35 is positioned in the lower portion of the casing beneath the drain so that the sediment and grease flowing from the kettle may be collected. This container 35 is arranged so that it may be drawn forwardly from the bottom of the casing, and is provided with a suitable handle 36 to facilitate the removal and replacement of the container.

As has been pointed out, I provide a suitable source of heat for the kettle and apply the heat substantially at the frying level of the grease. I prefer to use electric heating units of the immersion type. As shown, I have provided a plurality (five) of electric immersion units 37 spaced at intervals along the length of the kettle and extending substantially across the full depth of the kettle, i. e., from its front to its rear wall. These units are positioned just below the frying level (Fig. 2) and thus at a considerable distance from the bottom of the kettle. This arrangement is an important feature of my invention in that while any suitable frying temperature, such as 400° F., may be produced above the units, the grease below the units in the sediment well will remain at a comparatively cool temperature, such as 200° F. As a result, it is very unlikely that the sediment, which naturally collects in the bottom of the kettle, will be charred or that the grease will be carbonized. It will be understood that if the heating units were positioned in the sediment portions of the kettle, it is very likely that they would become embedded by the sediment collecting in the bottom and thus would tend to overheat with the possibility of damaging the units, and of burning the sediment and tainting the grease. This feature together with the quick opening drain for flushing out the accumulated sediment makes it possible to keep the grease pure so that it may be used over and over again. Moreover, the position of the heating units substantially at the frying level facilitates cleaning both units and the bottom of the kettle.

The immersion heaters 37 preferably are of the sheath wire type such as described and claimed in the United States Patent No. 1,522,992, granted to C. C. Abbott, dated January 13, 1925, and briefly each heater comprises a unit having an outer metallic sheath in which a helical resistance conductor is embedded in a compacted insulating material. It will be understood that such units can be bent easily into any desired shape. In the immersion heater shown the unit is bent substantially in the form of a hair pin. Obviously, various other arrangements and configurations of the heating unit may be used. Each unit is provided with a screw supporting plug 38. Preferably and as shown, each heater will be provided with two hair pin heating units, separate terminals and connections being provided whereby the units may be connected in series or in parallel relation with an electrical supply source or one unit alone may be connected with the source in a well-known manner so as to regulate the amount of heat produced.

As thus constructed the immersion heaters are applied to the kettle by inserting them through suitable apertures 40 provided in the front wall of the kettle, a tapped portion 41 being fixed about each aperture for receiving the screw plug 38. In order to apply a unit it is merely necessary to insert the unit through the aperture 40 and screw the plug support 38 into the threaded receptacle 41; to remove the unit it is merely necessary to unscrew the plug. These operations may be accomplished conveniently by means of a suitable socket wrench.

A receptacle 42 positioned between the front wall of the casing and the front wall of the kettle is provided for receiving the terminals 43 of the heating units. This receptacle normally is closed by suitable cover members or doors 44.

The automatic temperature control for holding the grease at the proper temperature comprises a suitable thermostat 45 arranged to control the heating units responsively to the temperature of the kettle grease so that this temperature is maintained at a substantially constant preselected value. Preferably, this thermostat is positioned so that it will respond to the temperature of the grease substantially at the frying level since with this arrangement the most sensitive and accurate heat control is provided. As shown, the thermostat is applied to the kettle through its front wall substantially in the same level as the heating units, and so that the adjustment portion 45a of the thermostat is readily accessible from the front of the fry kettle. It will be understood that a suitable gland and bushing 46 will be provided to prevent leakage through the thermostat mounting. This mounting preferably will provide for a ready application and removal of the thermostat.

It is believed to be unnecessary for a proper understanding of this invention to describe in detail the electrical connections and unit control apparatus which is caused to respond to the thermostat actuator 45 since any preferred well-known arrangement of these parts may be used. The switches, control contactors and other control apparatus provided for the heater are enclosed in safe compartments 47 arranged in the lower portion of the casing 11, the electrical connections between these elements and the units being passed from the casing 47 to the compartment 42 through a suitable bushing 48. Access to the switch compartments 47 may be had by means of suitable doors 49 which preferably will open downwardly and will be spring closed. The switch controls 50 and their associated dial panels 51 are located in recesses 52 provided in the front wall of the shell 11 so as to be readily accessible to the attendant.

The grease kettle is provided with a lower screen 55 which is positioned directly over the heating units and which has an area substantially the same as the cross sectional area of the kettle. This screen serves to protect the units from accidental damage and to prevent the materials being fried from passing to the lower portions of the kettle; that is the screen serves to maintain these materials substantially at the frying level of the grease. Suitable pairs of brackets 56 positioned on the front and rear walls respectively are provided to support the screen 55. The kettle is also provided with an upper or sinker screen 58 which serves to force the doughnuts or crullers or like material being fried and which tend to rise and float on the grease down into the grease. This screen also has an area substantially equal to the cross sectional area of the kettle; it is mounted at its rear end by means of bracket members 60 and is supported at its front end by means of anchor members 61. As shown, these anchor members have outwardly projecting portions 61a at their upper ends so that when the screen is positioned in the kettle they will engage the front portion of the kettle flange 23 to support the screen in its proper position which is substantially parallel with the screen 55. This screen is provided with a handle 62 so that it may be moved conveniently either from the kettle or into its operating position in the kettle.

In order to protect the front panel which includes the thermostat, switch controls, etc., from a possible overflow of grease from the kettle, I provide a suitable grease guard 63 which as shown projects outwardly from the top portion of the front plate 17 in apron-like fashion. This apron may be and preferably is formed integrally with the kettle flange portion 23b.

If desired the kettle may be provided with a cover member 64 having suitable handle members 65 for covering the kettle when it is not in use.

In operation, assuming that the kettle is cold and that the grease container 10 has been filled with the proper quantity of grease, the thermostat will be adjusted to the desired temperature setting and the grease will be preheated to the desired frying temperature by an appropriate control of the heating units 37 for a high preheat. After the grease has attained its frying temperature the controls will be moved either to their medium or low heat positions, as the case may be, and the thermostat thereafter will serve to maintain the grease at the selected temperature. The edibles to be fried will then be placed in the hot grease and the sinker screen 58 positioned in the kettle so as to force these materials substantially to the frying level. After the materials have been fried, the sinker screen 58 will be removed allowing the materials to float to the top surface of the grease so that they may be removed in any suitable manner from the kettle. Fresh material may then be placed in the kettle and fried in a similar manner.

When it is desired to flush the kettle it is necessary merely to open the valve 32 and allow the grease together with the sediment to pour into the receiver 35. It will be understood that the sediment may be removed by any suitable means and the purified grease used again.

The fry kettle shown in Figs. 3 and 4 and embodying a modified form of my invention is adapted particularly to deep fat frying operations of meat, potatoes, sea foods, etc. This kettle is of substantially the same construction as that shown in Figs. 1 and 2 in that it is provided with a grease kettle 70 and a supporting shell or casing 71. This casing 71 is formed in substantially the same manner as is the casing 11 of Figs. 1 and 2 and serves to support the grease kettle 70 in substantially the same manner as the grease kettle 10 is supported in its casing 11. The kettle is provided with a supporting flange 72 secured to the upper portion of the casing 71, the front portion of the flange being projected forwardly so as to provide a table or ledge 72a. The kettle is also provided with a tapered bottom 73 which serves to collect the sediment which naturally falls from the materials being fried, and with a drain 74 in which a suitable control valve 75 is interposed. This valve is controlled by a suitable hand wheel 76 arranged at the front of the kettle and mechanically connected with the valve by means of an extension stem 76a. In this case, however, the drain 74 instead of opening into the bottom portion of the casing, as does the drain 31 of Figs. 1 and 2, is brought forward so that it opens on the front exterior of the casing. It will be understood that while the kettle is being drained, a suitable container will be positioned beneath the drain opening 75a to receive the grease and sediments being flushed from the kettle.

The kettle is provided with immersion electrical heaters similar in construction to the heating units 37 of Figs. 1 and 2 and mounted in the kettle in a similar fashion substantially at the frying level of the grease. These units are controlled to maintain the temperature of the grease in the kettle at a substantially constant preselected value by means of suitable thermostatically controlled mechanism comprising a thermostatic actuator 77 which as shown is positioned substantially at the frying level of the grease and which is provided with an adjustor portion 77a arranged at the front wall of the casing so as to be readily accessible. As before, the heating units are provided with control knobs 78 and dials 79 which as shown also are readily accessible from the front of the casing. The switches, contactors and other control apparatus are enclosed in safe metallic containers 80 which are provided with doors 81 opening to the front of the kettle.

The kettle is also provided with a screen 82, similar to the screen 55 of Figs. 1 and 2, and in this case serves both to protect the heating units against accidental damage and to support the basket 83 in which the edibles to be fried will be placed. It will be understood, of course, that an upper or sinker screen is not necessary in this case since meats, potatoes, sea foods, etc. gravitate toward the bottom of the kettle rather than tend to float to the top.

An important feature of this modification is the provision of a guard which tends to prevent the overflow of the foam which ordinarily rises and which in the past was allowed to overflow the kettle. This foam guard comprises a cylindrical-like member 84 having a contour substantially the same as that of the kettle. In this case the guard comprises front and rear walls 85 and 86 and a pair of end walls 87 and 88. These walls will be so proportioned that when the guard is positioned within the kettle they will leave a comparatively small annular space between the inner surfaces of the kettle and the outer surfaces of the guard. As shown Figs. 3 and 4, this guard when it is positioned in the kettle rests upon the screen 82 and is sufficiently high to project for a short distance above the upper surfaces of the flange 72. This guard preferably will be provided with a plurality of retaining portions 89 which project outwardly a sufficient distance to frictionally engage the inner surfaces of the kettle when the guard is being applied to the kettle. These portions may be formed by pressing them from the metal of the guard walls. The guard is also provided with suitable handle members 90 to facilitate its application to and its removal from the kettle.

In operation, this guard tends to prevent overflow of the foam which ordinarily rises above the materials being fried, particularly at the time these materials are placed in the hot grease. Even if a portion of this foam should overflow the top edge of the guard, it will be condensed by the guard and run down into the kettle in the annular space between the outer walls of the guard and the inner walls of the kettle.

This fry kettle also may be provided with a suitable apron-like grease guard 91 which as before preferably will be formed integrally with the supporting flange 72 of the grease kettle.

If desired a suitable guard rail 92 may be provided for the kettle. This guard may be supported from the grease guard 91 by means of suitable bracket members 93.

In operation, the grease will be preheated with the units connected to develop a very high rate of heat generation, and after the grease has been heated to the desired frying temperature, the units will be turned to either their medium or low heat positions, as the case may be. As before the selected temperature will be maintained substantially constant by means of the thermostatic control.

It will be understood that with either kettle the thermostat may be adjusted at any time during the operation so as to set a different temperature to be maintained in the grease kettle. However this generally is not necessary.

After the grease has attained its desired temperature the materials to be fried will be placed in the basket 83 which will be lowered by means of its handle 83a into the hot grease. When the materials have been fried sufficiently the basket 83 will be removed, after which a fresh supply may be placed in the basket and applied to the grease.

It will be observed that these fry kettles are of a very simple construction and moreover are very easy to operate. Heretofore, food frying operations required very close attention by reason of the uncertain temperatures and the necessity of occasionally removing the kettle to the top of the apparatus. My automatic temperature control assures a fine product with perfect safety, while allowing the attendant to perform other duties. All of the controls including the thermostat adjusting member, the valve control and the heat controls are readily accessible from the front of the apparatus. Moreover, the projecting flange portion at the top front of the apparatus affords a ledge or table along the front edge which is convenient in the operation of the kettle and facilitates the frying operations.

What I claim as new and desire to secure by Letters Patent of the United States is:

1. Frying apparatus comprising a casing and a grease kettle mounted within said casing, said grease kettle having a grease retaining portion and a flange portion projecting therefrom, means securing said flange to the upper portions of said casing, a portion of said flange projecting horizontally outwardly beyond one side of said casing so as to provide a table, and thence downwardly at an angle from said horizontal portion to define an apron-like grease guard for protecting the front surface of said casing.

2. Frying apparatus comprising a casing, a grease kettle mounted within said casing, said grease kettle having a grease retaining portion and a flange projected therefrom, means securing said flange to the upper portions of said casing, a portion of said flange projecting outwardly beyond the front wall of said casing so as to provide a ledge, and an apron-like grease guard member secured to said flange and projecting at an angle therefrom so as to protect the front surface of said casing.

3. A fry kettle comprising a grease kettle and walls positioned within said kettle and spaced from the inner side walls thereof so as to prevent the overflow of foam, arising in trying operations, from the mouth of said kettle, said guard walls being provided with protuberances frictionally engaging said side walls to removably secure said side walls within said kettle.

4. Frying apparatus comprising a grease kettle and a guard for preventing the overflow of an excessive foam rise above the edibles being fried comprising a guard member positioned within said kettle, said member having walls spaced comparatively close to the inner surfaces of the side walls of said kettle and projecting from the mouth of said kettle, said walls having portions in sliding frictional engagement with said inner surfaces so that said member may be readily withdrawn from and inserted in said kettle longitudinally thereof and so that said member is secured in operating position in said kettle by the frictional engagement with said surfaces, the space between said guard and said side walls communicating freely with said kettle so that in the event grease flows over the upper edge of said guard walls to said space it will be condensed and returned to the kettle.

5. Frying apparatus comprising a grease kettle having a sediment well in the lower portion thereof, heating means immersed in the grease in an upper region of said kettle for applying heat to the grease in said upper region whereby the grease in said upper region is heated to a relatively high temperature to constitute a frying region materially above said sediment well, while the grease and food sediment in said well retain a relatively low temperature as compared with the grease in said frying region, said heating means being mounted above said well a distance sufficient to prevent sediment in said well contacting said heating means, and a temperature responsive element for controlling said heating means immersed in the grease in said upper region adjacent said heating means and mounted above said sediment well a distance sufficient to prevent sediment in said well contacting said temperature responsive element.

6. Frying apparatus comprising a grease kettle, immersion heating units within said kettle above its bottom wall arranged to establish a relatively high temperature frying region in said kettle above said bottom wall, a foraminous screen interposed between said frying region and said heating units having an area substantially equal to the cross-sectional area of said kettle so as to prevent edibles being fried from contacting said heating units and a basket for containing edibles resting on said screen, said basket having a cross-section relatively small as compared with the area of said screen so that the grease heated by said units can freely circulate through said screen and around and about said basket.

7. Frying apparatus comprising walls forming a casing, a grease kettle supported within said casing from its upper wall portion, a drain conduit within said casing communicating with said kettle through its bottom wall, a container within said casing below said drain conduit, said casing being provided with an opening providing for the insertion and removal of said container, a valve controlling said drain conduit, a control member for said valve on the exterior of said casing and an operating connection between said control member and said valve.

8. Apparatus for grease frying operations comprising a grease kettle, a casing supporting said kettle and a guard for the front wall of said casing comprising a ledge projecting forwardly from the upper edge of said wall, said ledge having a portion depending downwardly therefrom and terminating in another portion flaring outwardly at an angle to the depending portion.

9. Frying apparatus comprising a grease kettle, a foam guard positioned within said kettle having walls substantially concentric with and spaced from the inner walls of said kettle, said walls embracing the frying region of said kettle and extending to a plane elevated with respect to the mouth of said kettle, the space between said foam guard walls and said inner walls being in open communication with the lower portion of said kettle so that in the event grease flows over the upper edge of said foam guard walls into said space it is returned directly to said kettle, and means effecting frictional sliding engagement between said foam guard walls and the inner walls of said kettle providing for ready removal and insertion of said foam guard and for securing it in concentric position in said kettle.

JACOB L. SHROYER.